United States Patent [19]
Fletcher et al.

[11] 3,964,902
[45] June 22, 1976

[54] METHOD OF FORMING A WICK FOR A HEAT PIPE

[75] Inventors: James C. Fletcher, Administrator of the National Aeronautics and Space Administration, with respect to an invention of Frank G. Arcella, Bethel Park, Pa.; Ernest C. Phillips, Jr., Smithton, Pa.; Richard P. Sprecace, Murrysville, Pa.

[73] Assignee: The United States of America as represented by the United States National Aeronautics and Space Administration, Washington, D.C.

[22] Filed: Feb. 27, 1974

[21] Appl. No.: 446,567

[52] U.S. Cl. .................. 75/225; 29/182; 29/193; 55/523; 55/526; 165/105
[51] Int. Cl.² .................. B22F 1/00; B22F 3/00; B21C 37/00; B01D 39/06
[58] Field of Search .................. 75/200, 208 R, 225, 75/214; 29/182.2, 180 S, 193; 165/105; 55/523, 525, 526

[56] References Cited
UNITED STATES PATENTS

| | | | |
|---|---|---|---|
| 2,829,733 | 4/1958 | Bartels | 55/526 |
| 2,876,097 | 3/1959 | Fisher | 55/523 |
| 3,087,233 | 4/1963 | Turnbull | 55/523 |
| 3,327,866 | 6/1967 | Pall | 210/499 |
| 3,437,783 | 4/1969 | Lemelson | 75/200 |
| 3,490,902 | 1/1970 | Fisher | 75/200 |
| 3,567,437 | 3/1971 | Mott | 75/200 |
| 3,690,606 | 9/1972 | Pall | 29/182.2 |
| 3,700,419 | 10/1972 | Sorgenfrei | 75/208 R |
| 3,759,708 | 9/1973 | Sundberg | 75/208 R |
| 3,801,446 | 4/1974 | Sparber | 165/105 |

Primary Examiner—Benjamiin R. Padgett
Assistant Examiner—Donald P. Walsh
Attorney, Agent, or Firm—Monte F. Mott; Wilfred Grifka; John R. Manning

[57] ABSTRACT

A method of forming a tubular wick for a heat pipe. The method is characterized by the steps of forming a wick blank of a predetermined thickness comprising a plurality of superimposed layers of stainless steel mesh screen, wet rolling the blank for reducing the thickness thereof, wrapping the blank about an inner mandrel, compressing the blank into a rigid tubular structure, removing the tubular structure from the mandrel and sintering the tubular structure.

1 Claim, 3 Drawing Figures

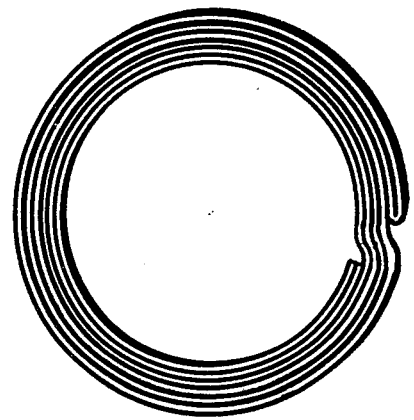
Fig. 2
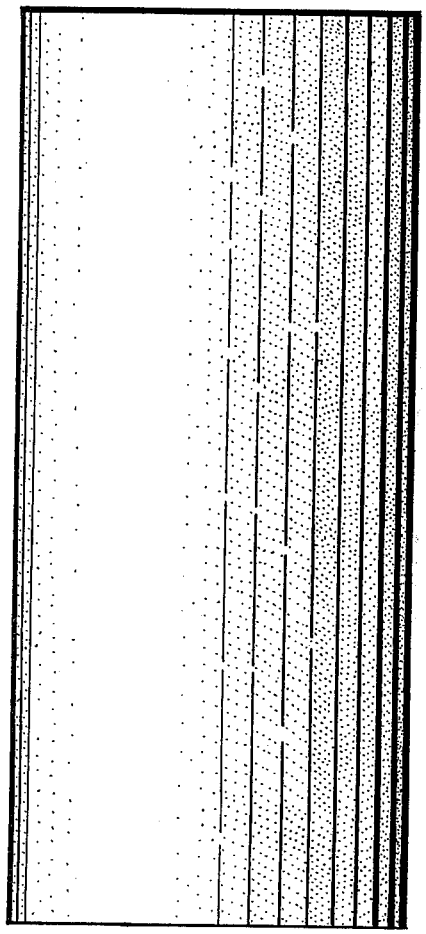
Fig. 1
SCREEN FOLDED & SPOT WELDED → ROLLED IN WATER BATH → MOUNTED ON MANDREL → SWAGED → CHEMICALLY ETCHED → SINTERED
Fig. 3

3,964,902

METHOD OF FORMING A WICK FOR A HEAT PIPE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The invention relates, generally, to heat pipes and more particularly to a method for forming an improved wick for a heat pipe.

2. Description of the Prior Art

As is well understood by those familiar with heat pipes, the sizes of wick pores preferably are as small as it is possible to make them in order to achieve maximum capillary pumping pressures in order to minimize the working fluid inventory in the wick.

One of the most successful methods of producing tubular heat pipe wicks heretofore employed involves the steps of wrapping a fine mesh metallic screen about an inner mandrel, inserting the wrapped inner mandrel into an outer mandrel, and then passing the resulting assembly through a swaging machine, or drawing die, for deforming the screen into a porous, though rigid, tubular structure. The mandrels subsequently are removed from the tubular structure through a preferential chemical etching technique, while the wick ultimately is subjected to a sintering operation in order to further increase the density and rigidity of the structure.

It is the general purpose of the instant invention to provide an improved method for forming a heat pipe having an enhanced density and rigidity, and pores of selectively reduced sizes.

OBJECTS AND SUMMARY OF THE INVENTION

It is therefore an object of the instant invention to provide an improved method of forming a wick for a heat pipe.

It is another object to provide an improved method of forming a wick for a heat pipe.

It is another object to provide an improved method of forming a wick for a heat pipe having pores of selectively reduced sizes.

It is another object to provide an improved method for forming a heat pipe of a tubular configuration having smaller pores, increased density and greater rigidity.

It is another object to provide a method for forming a wick for a heat pipe which includes the steps of folding into multiple layers a metallic screen, welding the layers together to form a blank, saturating the blank with water and subjecting the blank, while saturated with water, to a flat rolling operation for upsetting material of the layers to reduce the pore size of the resulting wick and to remove oxides from the surfaces of the blank, whereby clean metal is permitted to contact clean metal for enhancing joining of the layers during sintering.

These and other objects and advantages are achieved by forming a wick blank of a predetermined thickness comprising a plurality of superimposed layers of stainless steel mesh, such as 304 stainless steel mesh, of 400 to 500 mesh, saturating the blank with water and subjecting the saturated blank to a flat rolling process for reducing the thickness of the blank to approximately one-half or less its original thickness, wrapping the blank about an inner mandrel, inserting the resulting assembly into an outer tubular mandrel, passing the resulting assembly through a swaging machine to deform the screen into a porous, though rigid, tubular structure, removing the mandrels by preferential chemical etching, and ultimately subjecting the tubular structure to a sintering operation for further increasing the density and rigidity of the resulting wick.

BRIEF DESCRIPTION OF THE DRAWINGS

FIG. 1 is a side elevational view of a wick typifying a wick fabricated through the use of the method of the instant invention.

FIG. 2 is an end elevational view of the wick.

FIG. 3 is a flow diagram illustrating the sequential steps of the method of the instant invention.

DESCRIPTION OF THE PREFERRED EMBODIMENT

Referring now to the drawings wherein like reference characters designate like or corresponding parts throughout the several views, there is shown in FIG. 1 a wick fabricated employing a method which embodies the principles of the instant invention. It will be appreciated, of course, that the wick is of a tubular configuration, while the regularity of the surface is varied, depending upon the use to which the wick is put.

The wick is formed by selecting a sheet of metallic screen of fine mesh, preferably 400 to 500 mesh, and folding the screen into a double thickness having superimposed layers. A screen formed of 304 stainless steel serves quite satisfactorily for this purpose. The layers of the screen are spot welded together, in several places, in order to maintain the established reltionship between the layers. The thus folded and welded sheet serves as a blank from which the wick is fabricated. It is, of course, in many instances, preferred that the sheet of screen be cleaned through a suitable cleaning operation, including a dipping thereof, in a suitable acid bath, prior to performing the steps of folding the screen into multiple layers.

The blank thus formed is next subjected to a flat rolling process which serves to plasticize or upset the metal of the layers of the blank for reducing the size of the mesh openings. The extent to which the size of the openings is reduced is dictated, in part, by the number of passes made during the step of flat rolling the blank. In practice, a reduction of 50% has been achieved when employing the aforementioned screen.

It has been found that by saturating the blank with water, and thereafter performing the step of flat rolling the blank while the blank remains saturated, wrinkling and puckering of the blank during the rolling process are substantially avoided. Moreover, the rolling of the blank serves the additional function of further cleaning the material of the screen by fracturing crust of oxides between the contiguously mated surfaces of the layers so that the oxides are removed from the surfaces in a smearing fashion. Such removal of oxides facilitates metal-to-metal contact, which, of course, enhances joining of the layers during sintering operations, subsequently performed, as hereinafter more fully described.

The blank is next wrapped around an inner mandrel, formed of a suitable material, in a manner well understood by those familiar with the art of fabricating heat pipes, and then inserted into an outer tubular mandrel. The entire resulting assembly is next passed through a swaging machine, or drawing die which further upsets the material of the blank to permanently deform the screen into a porous, rigid tubular structure. The mandrels and the thus formed tubular structure are disassociated by a preferential chemical etching process, also well within the skill of the art.

The tubular structure, once removed from the mandrels, is, where so desired, subjected to a sintering process for further increasing the density of the wick and the rigidity of the structure. Such a process is typified by the steps of heating the wick to 1,000° C. to 1,200° C. for a period of one-half hour in a high-vacuum reducing environment.

Once the sintering process has been completed, it is possible to determine the porosity of the wick through a well known "bubble testing" technique.

In view of the foregoing, it should readily be apparent that through the instant invention, there has been provided a method for forming a wick for a heat pipe through which close dimensional control of the resulting wick is achieved.

Although the invention has been shown and described in what is conceived to be the most practical and preferred method, it is recognized that departures may be made therefrom within the scope of the invention, which is not to be limited to the illustrative details disclosed.

What is claimed is:

1. A method for forming a wick for a heat transfer pipe adapted to utilize evaporation, condensation and surface tension characteristics of a working fluid within a closed container, comprising the steps of:
   A. forming a blank from which a wick is to be shaped by folding a sheet of metallic screen of fine mesh into superimposed layers, uniting said superimposed layers by spotwelding the layers together, saturating said layers with water, and flat rolling the layers while in a saturated condition, whereby said blank is plasticized for reducing the size of the mesh opening;
   B. permanently deforming the blank into a cylindrical structure by wrapping the blank about an inner mandrel and inserting the inner mandrel into an outer mandrel of a cylindrical configuration and swaging the mandrels and the blank;
   C. disassociating the mandrels from the blank by selectively etching the mandrels; and
   D. sintering the blank by subjecting the blank to elevated temperatures in a high vacuum environment.

* * * * *